US 8,209,851 B2

(12) United States Patent
Caya et al.

(10) Patent No.: US 8,209,851 B2
(45) Date of Patent: Jul. 3, 2012

(54) APPARATUS FOR SHAPING RECTANGULAR WIRE COIL HEAD

(75) Inventors: Yves Caya, Longueuil (CA); Armand Caya, Boucherville (CA); Sylvain Lampron, Drummondville (CA); David Brabant, Longueuil (CA)

(73) Assignee: TM4 Inc., Quebec (CA)

( * ) Notice: Subject to any disclaimer, the term of this patent is extended or adjusted under 35 U.S.C. 154(b) by 669 days.

(21) Appl. No.: 11/412,066

(22) Filed: Apr. 25, 2006

(65) Prior Publication Data
US 2007/0000122 A1 Jan. 4, 2007

Related U.S. Application Data

(60) Provisional application No. 60/674,715, filed on Apr. 26, 2005.

(51) Int. Cl.
*B23P 19/00* (2006.01)

(52) U.S. Cl. ............... 29/735; 29/732; 72/301; 310/179

(58) Field of Classification Search .................. 29/33 M, 29/569, 732, 735; 72/31.01, 301; 310/179, 310/184
See application file for complete search history.

(56) References Cited

U.S. PATENT DOCUMENTS

| | | | | |
|---|---|---|---|---|
| 1,566,227 A | * | 12/1925 | Pleasant | 72/31.01 |
| 4,450,708 A | | 5/1984 | King | |
| 5,619,787 A | * | 4/1997 | Couture et al. | 29/732 |
| 5,926,940 A | * | 7/1999 | Toh et al. | 29/596 |
| 6,206,052 B1 | | 3/2001 | Bo | |
| 6,425,175 B1 | | 7/2002 | Sawada et al. | |

FOREIGN PATENT DOCUMENTS

| | | |
|---|---|---|
| CN | 1237922 A | 12/1999 |
| CN | 1283890 A | 2/2001 |
| CN | 2541082 Y | 3/2003 |
| DE | 33 896 | 8/1963 |
| EP | 1 041 702 A2 | 10/2000 |
| FR | 2 824 202 A1 | 10/2002 |
| GB | 2 079 194 A | 1/1982 |
| JP | 06261505 A | 9/1994 |
| JP | 2003/264965 | 9/2003 |
| WO | WO 00/04625 | 1/2000 |

* cited by examiner

*Primary Examiner* — Donghai D. Nguyen
(74) *Attorney, Agent, or Firm* — Muirhead and Saturnelli, LLC

(57) ABSTRACT

A machine to form the heads of coils made of relatively large rectangular wire so that it fits within the slots of the stator of an electric machine is described herein. The machine receives a coil having unformed first and second heads separated by first and second legs and apply controlled deformation thereto to yield properly shaped heads. The machine comprises first and second leg support mechanisms for gripping the first and second legs and four head forming elements for contacting portions of the heads of the wire coil while the first and second legs are gripped by the leg support. The head forming elements are mounted to the first and second leg support mechanisms for relative movement therebetween. Actuators, coupled to a controller so as to be controlled therefrom are provided for moving the head forming elements and the first and second heads between spaced apart relationships and forming relationships.

41 Claims, 14 Drawing Sheets

FIG_4

APPARATUS FOR SHAPING RECTANGULAR WIRE COIL HEAD

CROSS-REFERENCE APPLICATIONS

This application claims priority to U.S. patent application No. 60/674,715 filed on Apr. 26, 2005, and which is incorporated by reference herein.

FIELD OF THE INVENTION

The present invention relates to coils mounted to the stator of electric machines. More specifically, the present invention is concerned with a machine to shape the head of such coils when they are made of semi-rigid rectangular wire.

BACKGROUND OF THE INVENTION

Coils for electric machine made of a relatively large rectangular wire are known in the art. For example, U.S. Pat. No. 5,619,787 titled "Method for Mounting Conductor Sections Onto a Stator Frame of a Dynamoelectric Machine" and naming Pierre Couture et al. as inventors describes such a coil and a method of fabrication of the coil. FIG. 16 of this patent is particularly interesting since it illustrates a two-part mould used to form the head of the coil.

A drawback of the use of such a two-part mould to shape the head of the coil is the inherent contact between the mould portions and the rectangular wire forming the coil. Indeed, this contact may cause abrasion or other defects of the rectangular wire insulation. Furthermore, different two-part moulds must be machined for different coil head shapes.

OBJECTS OF THE INVENTION

An object of the present invention is therefore to provide a rectangular wire coil head shaping machine.

Other objects, advantages and features of the present invention will become more apparent upon reading of the following non-restrictive description of embodiments thereof, given by way of example only with reference to the accompanying drawings.

SUMMARY OF THE INVENTION

More specifically, in accordance with the present invention, there is provided a wire coil head forming machine for forming first and second heads of a semi-rigid wire coil separated by first and second legs, the machine comprising:
 a leg support for gripping the first and second legs;
 at least one head forming element for contacting at least a first portion of one of the first and second heads of the wire coil while the first and second legs are gripped by the leg support; the at least one head forming element being mounted to the leg support for first relative movement with the leg support; and
 a first actuator coupled to one of the at least one head forming element and the leg support for causing the first relative movement for moving the at least one head forming element and the at least a first portion of one of the first and second heads between a spaced apart relationship and a forming relationship.

According to a second aspect of the present invention, there is provided a wire coil head forming machine for forming first and second heads of a semi-rigid wire coil separated by first and second legs, the machine comprising:

first and second leg gripping mechanisms for receiving and restraining respectively the first and second legs; the second leg gripping mechanism being mounted to the first leg gripping mechanism for relative movement therebetween; and
 at least one actuator coupled to at least one of the first and second leg gripping mechanisms for causing the relative movement therebetween, thereby causing a controlled deformation to at least a portion of the first and second heads.

According to a third aspect of the present invention, there is provided a method for forming first and second heads of a wire coil separated by first and second legs, the method comprising:
 gripping the first and second legs of the wire coil;
 providing at least one head forming element;
 relatively moving the at least one head forming element and at least one of the first and second legs from a spaced apart relationship to a forming relationship wherein the at least one head forming element contacts at least a portion of the heads so as to cause a controlled deformation thereto.

Other objects, advantages and features of the present invention will become more apparent upon reading the following non restrictive description of illustrated embodiments thereof, given by way of example only with reference to the accompanying drawings.

DETAILED DESCRIPTION

Generally stated, the present disclosure is concerned with a head forming machine to form the heads of coils made of a relatively large rectangular wire. The resulting coils are configured to fit within the slots of the stator of an electric machine (not shown). The head forming machine receives a coil having unformed heads and apply controlled deformation thereto to yield properly shaped heads. The coil of wire is semi-rigid so as to be self-supporting.

Figure 1:
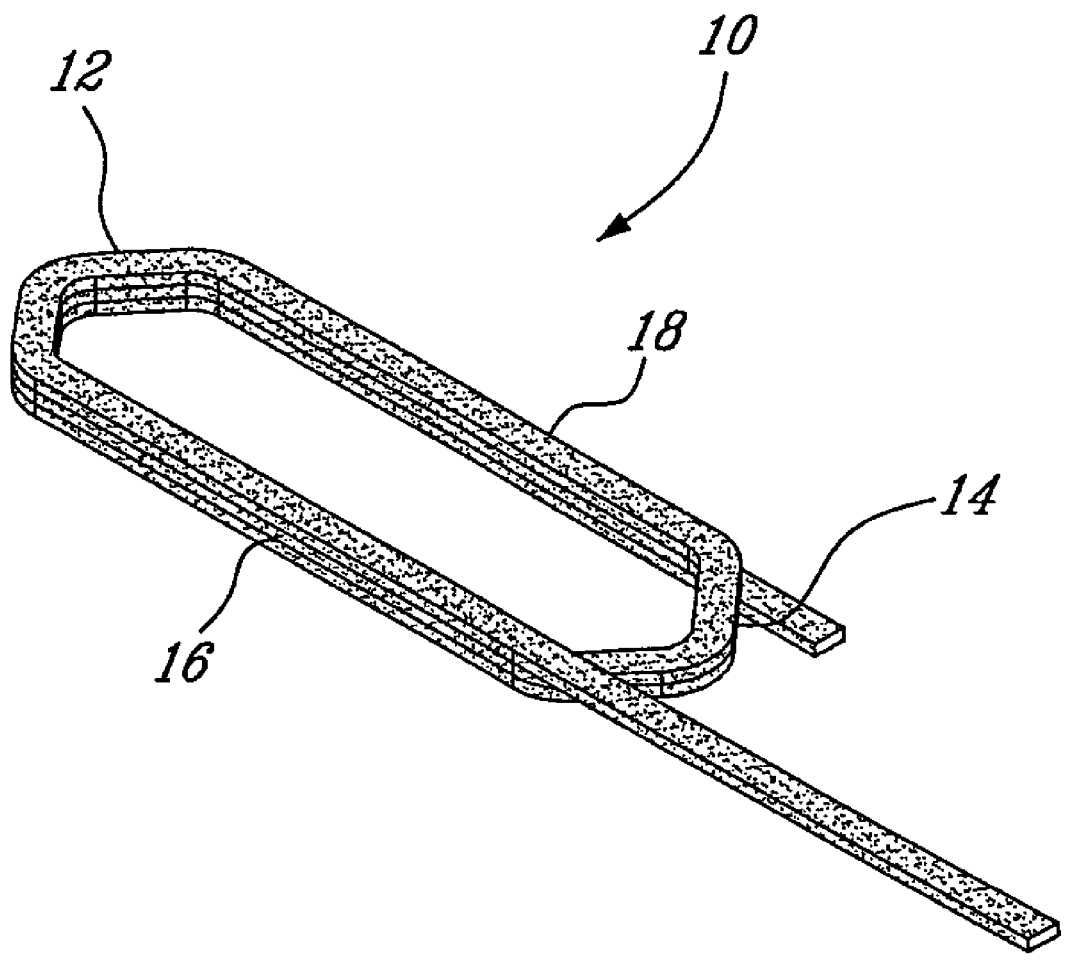
FIG. 1 is a perspective view of a coil made of a semi-rigid rectangular wire before any head-forming operation is done to it.
Figure 2:
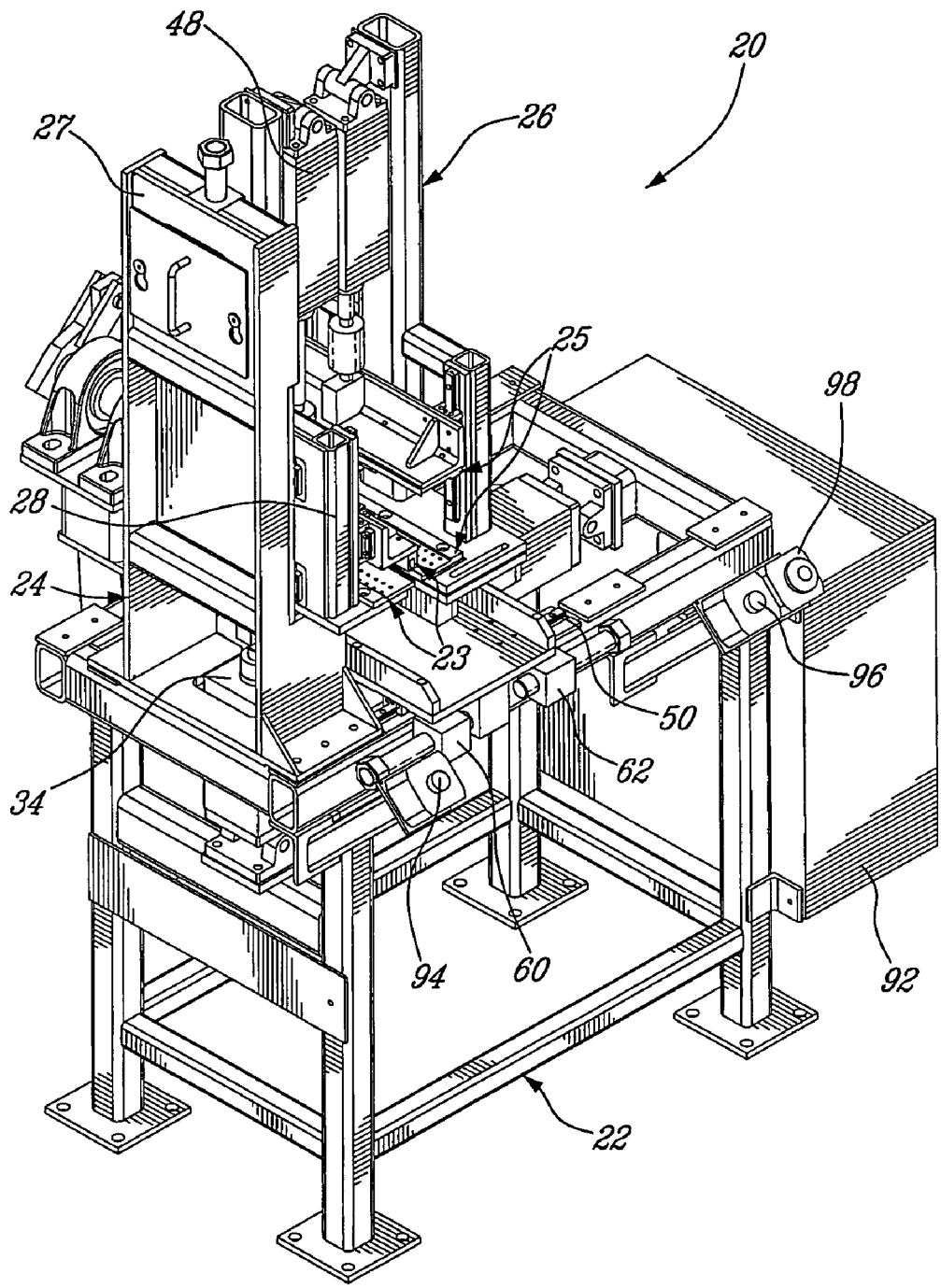
FIG. 2 is a front perspective view of a head forming machine according to an illustrative embodiment of the present invention.

FIG. 1 of the appended drawings illustrates a multiple-turn coil 10 having a first head 12 and a second head 14 separated by straight legs 16 and 18. It is to be noted that the heads 12 and 14 of the coil 10 are generally coplanar, thus unformed.

Turning now to FIGS. 2 to 5 of the appended drawings, a head forming machine 20 will be described. As will become more apparent upon reading the following description, the head forming machine 20 allows receiving and transforming a wire coil having one or many turns of wire.

The head forming machine 20 comprises a leg support, including first and second leg support mechanisms 23 and 25, respectively mounted to a frame 22 via first and second mounting assembly 24 and 26. The first and second leg support mechanisms 23 and 25 includes respective first and second leg receiving mechanisms 38 and 74 and respective first leg restraining element 40 and second leg restraining mechanism 76.

Figure 4:
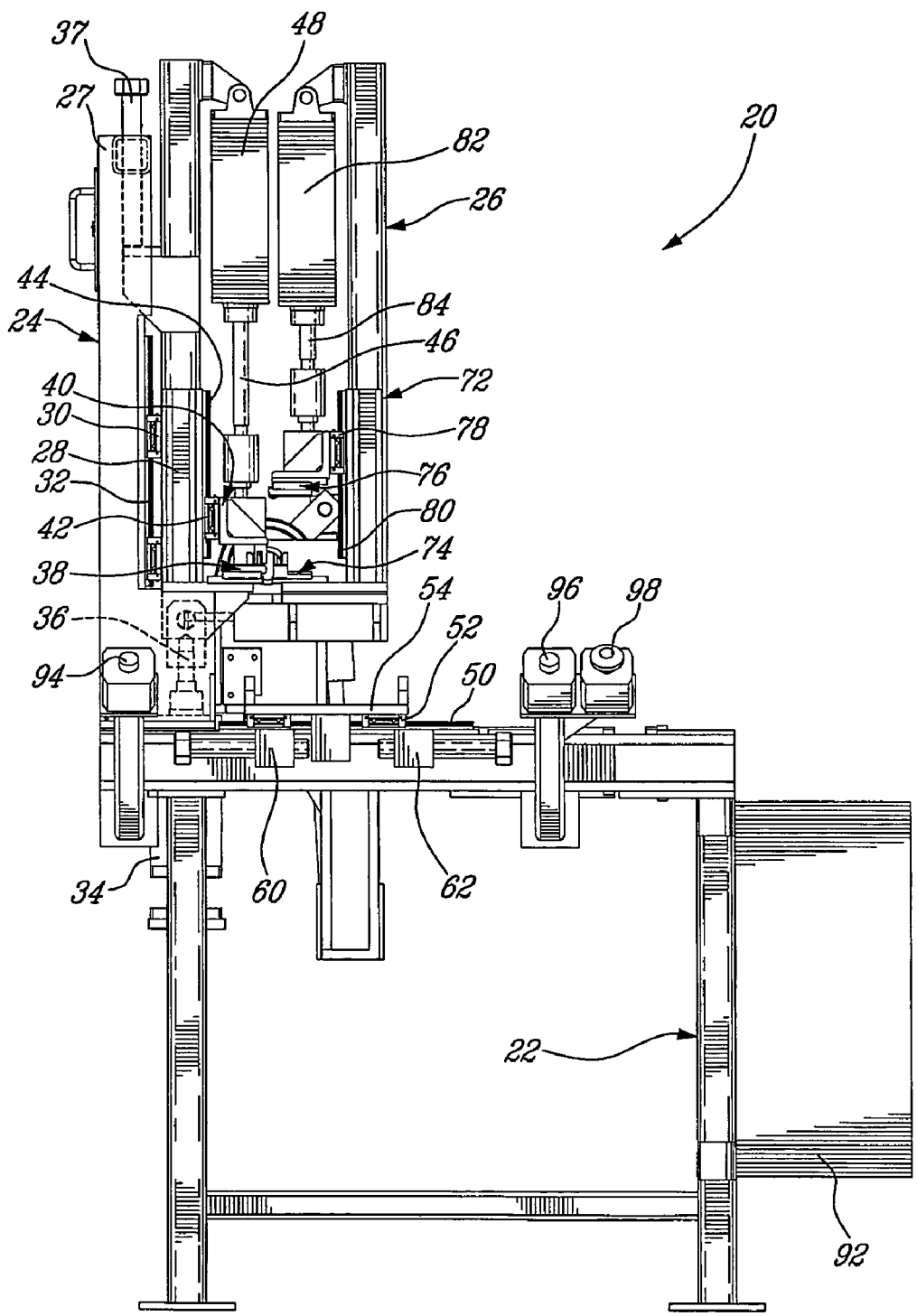
FIG. 4 is a front elevation view of the head forming machine of FIG. 2.
Figure 5:
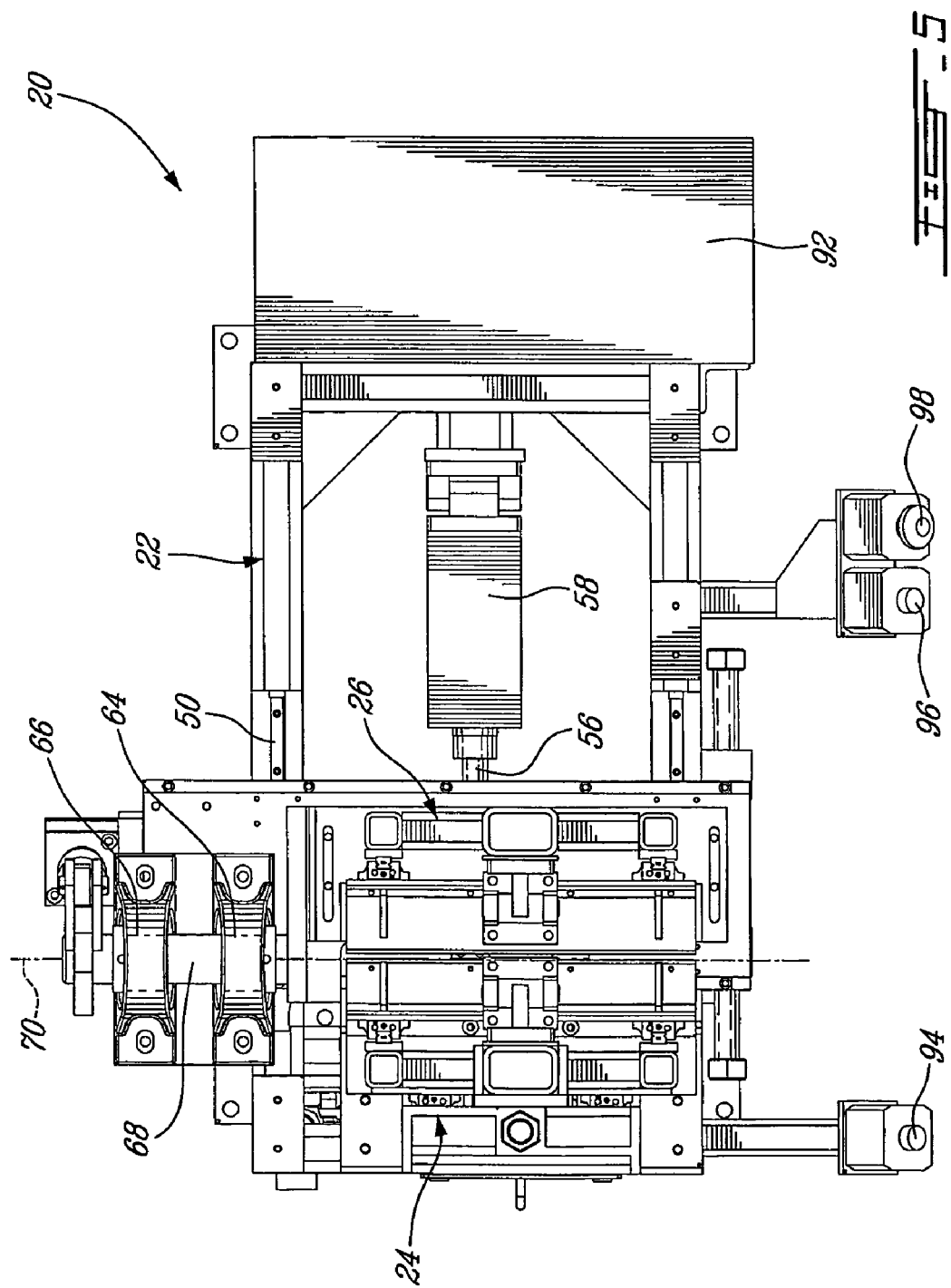
FIG. 5 is a top plan view of the head forming machine of FIG. 2.

The first mounting assembly 24 includes a fixed portion 27 and a movable portion 28 slidably mounted to the fixed portion 27 via corresponding sliding elements 30 and 32 (see FIG. 4). As can be better seen from FIG. 2, the movements between the fixed portion 27 and the movable portion 28 are actuated by a cylinder 34 mounted to the frame 22 and provided with a piston 36 (dashed lines in FIG. 4) connected to the movable portion 28. It is to be noted that an adjustable stop 37 limits the range of translation of the movable portion 27 with respect to the fixed portion 27.

As will now become more apparent, separating the leg support in two symmetrical leg support mechanisms 23 and 25 and slidably mounting the movable portion 28 to the fixed portion 27 allows the relative movements of the two symmetrical leg support mechanisms 23 and 25 along a first orientation. Moreover, as will be described hereinbelow in more detail, positioning head forming elements along the path of the wire coil heads 12-14 during movement thereof will allow applying controlled deformation thereto.

FIG. 4 shows the first leg receiving mechanism 38 fixedly mounted to the movable portion 28 of the first assembly 24 and the movable first leg restraining mechanism 40 slidably mounted to the movable portion 28 via corresponding sliding elements 42 and 44. A piston 46 of a cylinder 48 interconnects the first leg restraining element 40 to the movable portion 28 to selectively actuate the movements of the first leg restraining element 40. The first leg restraining element 40 is mounted to the movable portion for reciprocating movement between a resting position and a restraining position wherein it prevents the first leg 16 from moving in the first leg receiving mechanism 38. The leg receiving mechanism 38 and the leg restraining element 40 will be discussed in greater details hereinbelow.

Figure 3:
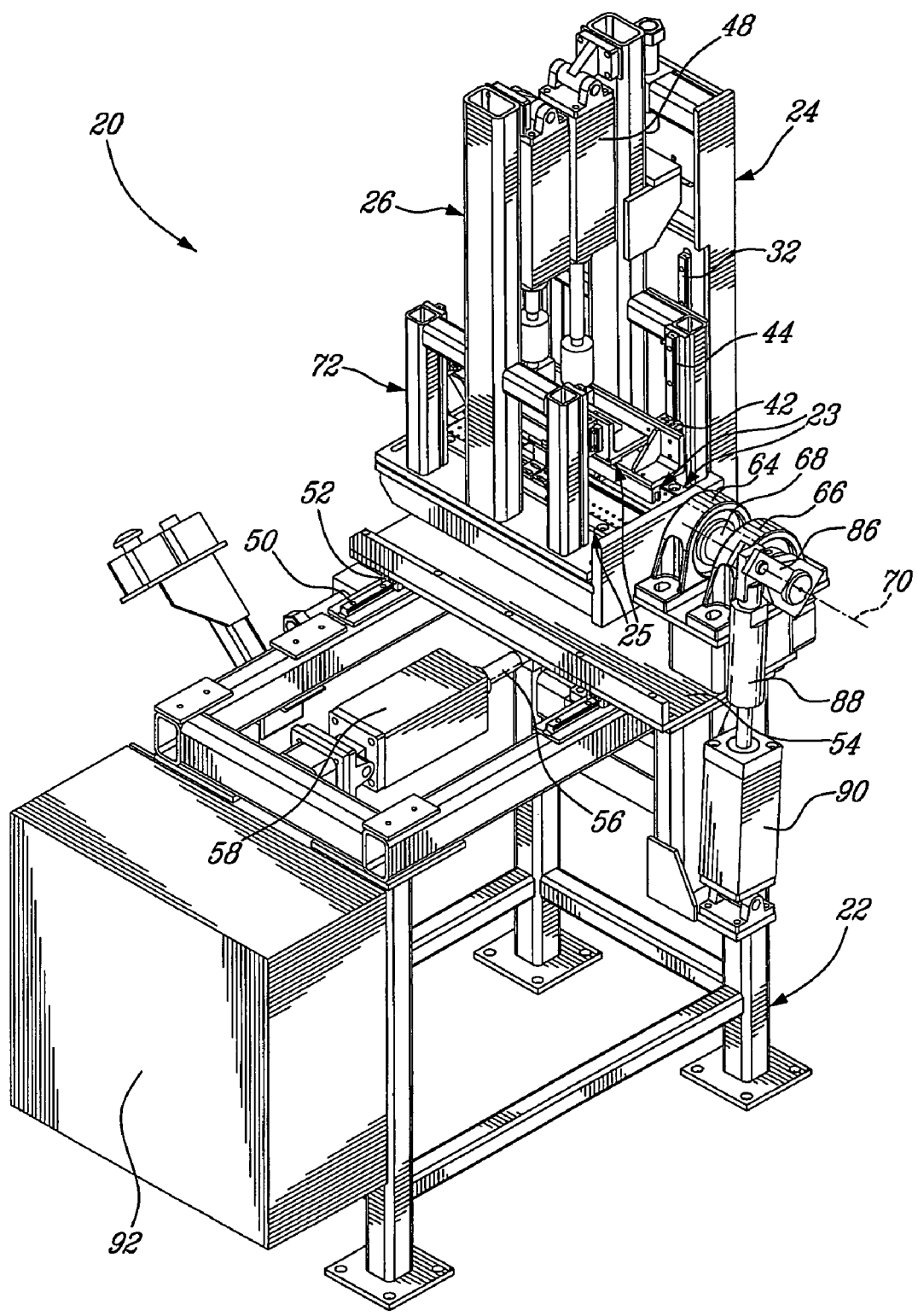
FIG. 3 is a rear perspective view of the head forming machine of FIG. 2.

Turning to FIG. 3 of the appended drawings, the second mounting assembly 26 includes a supporting table 54 which is slidably mounted to the frame 22 via corresponding sliding elements 50 and 52. A cylinder 58, provided with a piston 56, also interconnects the frame 22 and the table 54 to selectively actuate the sliding movements of the table 54 with respect to the frame 22. As is better seen from FIG. 4 of the appended drawings, two adjustable stops 60 and 62 limit the course of the table 54. As will be described hereinbelow in more detail, the sliding movement of the table 54 allows the relative movement of the two symmetrical leg support mechanisms 23 and 25 along a second orientation.

A pivoting sub-assembly 72, which includes the second leg support mechanism 25, is pivotally mounted to the table 54, thereby extending the range of movements between the first and second leg support mechanisms 23 and 25. More specifically, the pivoting sub-assembly 72 is mounted to the table 54 via a shaft 68 secured to the table 54 via two pillow blocks 64 and 66. The shaft 68 defines a pivot axis 70.

The second leg receiving mechanism 74 is fixedly mounted to the pivoting sub-assembly 72 and the movable second leg restraining mechanism 76 is slidably mounted thereto via corresponding sliding elements 78 and 80. A cylinder 82 provided with a piston 84 actuates the movements of the second leg restraining mechanism 76 with respect to the sub-assembly 72.

As can be better seen from FIG. 3, an arm 86 is mounted to the end of the shaft 68 and is connected to the piston 88 of a cylinder 90 to thereby interconnect the arm 86 to the table 54. Accordingly, the cylinder 90 actuates the pivoting movement of the shaft 68 about the axis 70.

A controller 92 is operatively connected to the various actuators of the machine 10 to control their operation. Furthermore, for safety reasons two distanced start buttons 94 and 96 are provided to start the machine 20. An emergency stop button 98 is also provided.

One skilled in the art will understand that the cylinders and pistons described hereinabove may be pneumatic or hydraulic. Also, other types of actuators can be used to actuate the mobile parts of the machine 20, including without limitations motors, belts and pulleys, etc.

Figure 6:
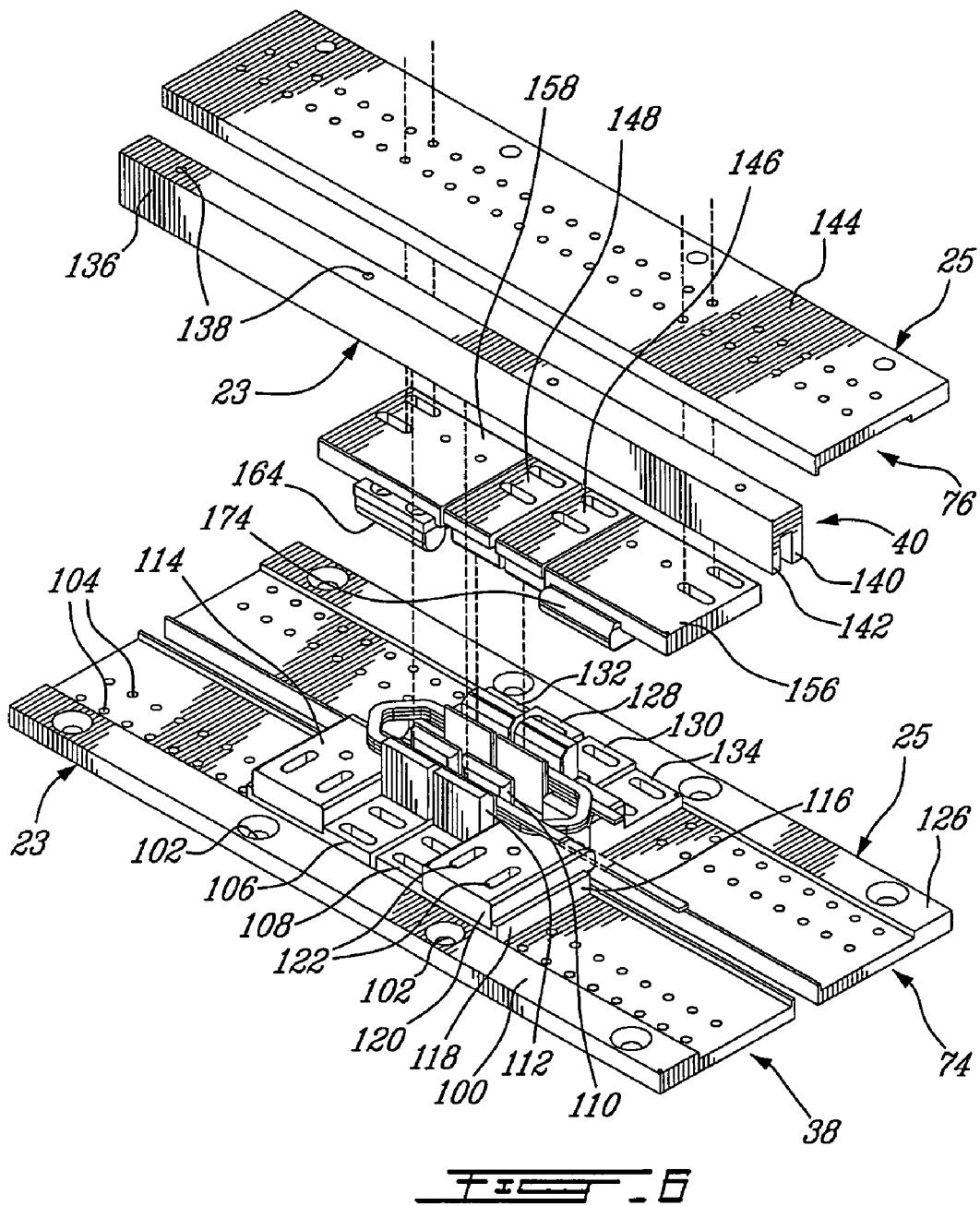
FIG. 6 is a top perspective view, partly exploded, of the leg support of the head forming machine of FIG. 2.
Figure 7:
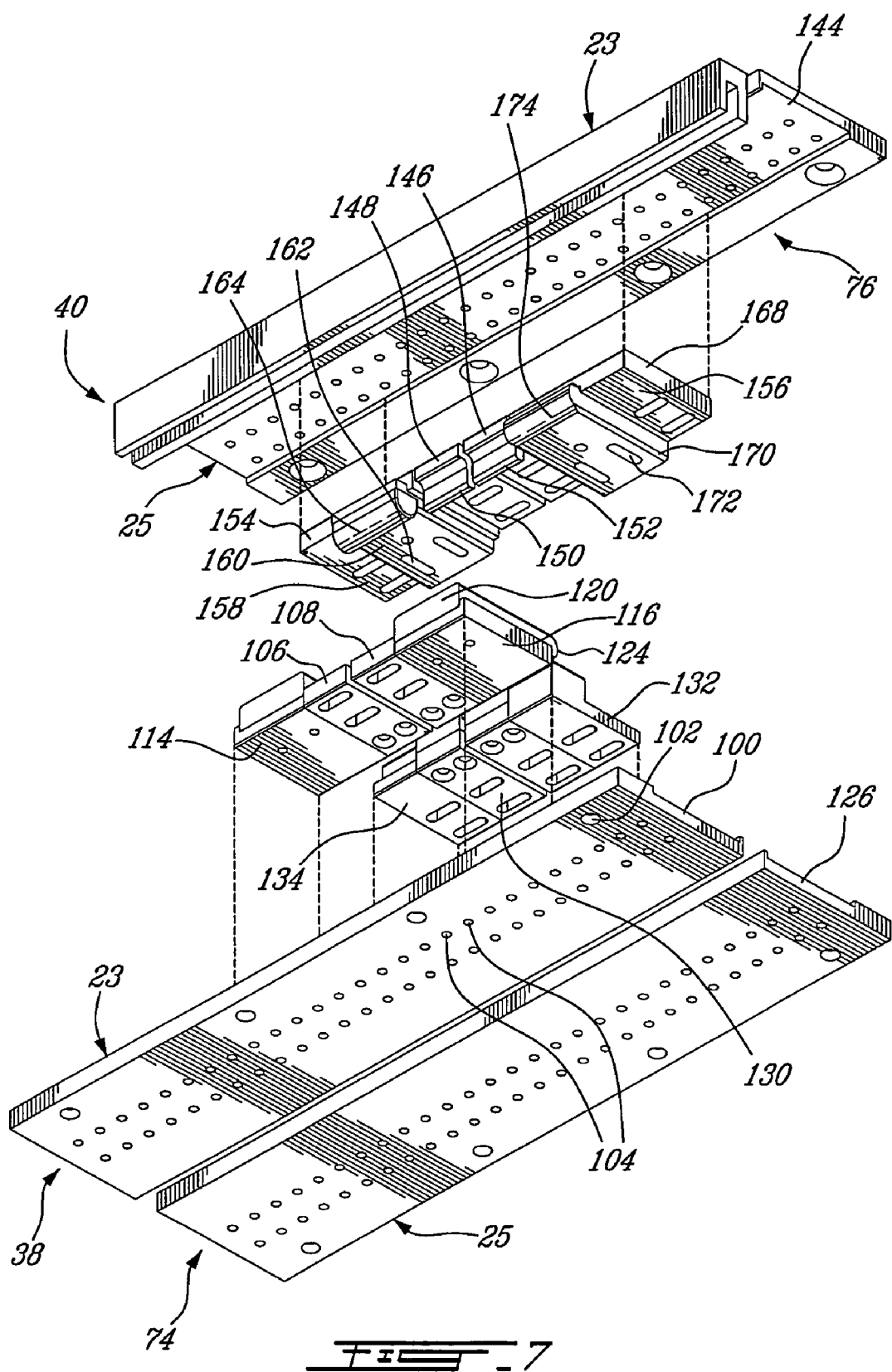
FIG. 7 is a bottom exploded perspective view of the leg support of FIG. 6.

FIGS. 6 and 7 illustrate in greater details the coil contacting portions of the first and second leg receiving mechanisms 38 and 74 and of the first and second leg restraining mechanisms 40 and 76.

The first leg receiving mechanism 38 includes a support plate 100 provided with apertures 102, designed to secure the support plate 100 to the first assembly 24, and smaller apertures 104.

A pair of U-shaped brackets 106 and 108, configured and sized to receive the first leg 16 of the coil 10, are mounted to the support plate 100 via fasteners (not shown) secured to the apertures 104. Each bracket 106 and 108 includes an inner wall 110 and an outer wall 112. The distance between the inner and outer walls 110 and 112 is such that the first leg 16 may be received therein.

The number of brackets may vary depending on the length of the leg 16 and/or the width of the bracket.

The first mounting assembly 24 further includes identical first and second head forming elements 114 and 116. For concision purpose, only the second head forming element 116 will be described herein. The second head forming element 116 includes a fixed portion 118 mounted to the support 100 via fasteners (not shown) and an adjustable portion 120 slidably mounted to the fixed portion 118 via fasteners (not shown) secured in elongated apertures 122. As can be better seen from FIG. 7, the adjustable portion 120 includes a rounded nose 124 that will impart a shape to one of the heads of the coil 10. As it is conventionally known, securing the adjustable portion through elongated apertures allows adjusting the position of the nose 124 relative to the head 12 or 14. Other adjusting means can also be provided. Of course, the head shaping elements 114 and 116 can be fixedly mounted to the mounting plate 100.

The second leg receiving mechanism 74 includes a support plate 126 identical to the support plate 100 of the first leg receiving mechanism 38. A pair of U-shaped brackets 128 and 130 identical to the brackets 106 and 108 is also provided mounted to the support 126.

The second leg receiving mechanism 74 further includes two head supports 132 and 134 configured and sized to support portions of the heads of the coil 10 when the second leg of the coils 10 is inserted in the U-shaped brackets 128 and 130.

The first leg restraining mechanism 40 includes a U-shaped element 136 having apertures 138 to secure the element 136 to the movable portion 28. The U-shaped element 136 includes an inner wall 140 and an outer wall 142. The outer wall 142 is so sized as to be slightly smaller than the distance between the inner and outer walls 110 and 112 of the brackets 106 and 108 for insertion therein.

As will be described hereinbelow in more detail by way of reference to the operation of the machine 20, the U-shaped element 136 prevents adverse movement of the first leg 16 of the coil 10 during forming of its heads 12-14 by selectively restraining the movement of the leg 16 onto the leg receiving mechanism 38. The first leg restraining mechanism 40 can have other adequate form for this function. For example, retractable hook elements could be provided in the U-shaped brackets 106 and/or 108.

The second leg restraining mechanism 76 includes a support plate 144 identical to the support plates 100 and 126 of the first and second leg receiving mechanisms 38 and 74.

As can be better seen from FIG. 7, the second leg restraining mechanism 76 also includes first and second identical projecting elements 146 and 148 each including a respective projection 150, 152 so configured and sized as to be slightly smaller than the distance between the inner and outer wall of the U-shaped brackets 128 and 130 of the second leg receiving mechanism for insertion therebetween. The projecting elements 146 and 148 are mounted to the support 144 via fasteners (not shown). As will be described hereinbelow in more detail, the he projecting elements 146 and 148 allows preventing adverse movement of the second leg 18 of the coil 10 during forming of its heads 12-14 by selectively restraining the movement of the leg 18 onto the leg receiving mechanism 74.

The second mounting assembly 26 further includes first and second head forming elements 154 and 156. The first head forming element 154 includes a fixed portion 158 mounted to the support 144 via fasteners (not shown) and a movable portion 160 slidably mounted to the fixed portion 158 via elongated apertures 162 and fasteners (not shown). The first head forming form 154 also includes a rounded projection 164 that will impart a shape to one of the heads of the coil 10.

Similarly, the second head forming element 156 includes a fixed portion 168 mounted to the support 144 via fasteners (not shown) and a movable portion 170 slidably mounted to the fixed portion 168 via elongated apertures 172 and fasteners (not shown). The second head forming element 156 also includes a rounded nose 174 that will impart a shape to one of the heads of the coil 10.

As will easily be understood by one skilled in the art, the plurality of even spaced apertures 104 of the supports 100, 126 and 144 allow the elements 106, 108, 114, 116, 128, 130, 132, 134, 146, 148, 156 and 158 to be removably positioned according to the dimensions of the coil to be formed. According to a further embodiment of the present invention, these elements are permanently secured to the supports 100, 126 and 144 using for example welding.

Turning now to FIGS. 8 to 12 the operation of the machine 20 will be described.

Generally stated, the operation of the machine 20 includes gripping the two legs 16 and 18 of the coil 10 and moving the legs 16-18 relatively to head bending forms for contact therebetween to cause the deformation of the heads.

Figure 8:
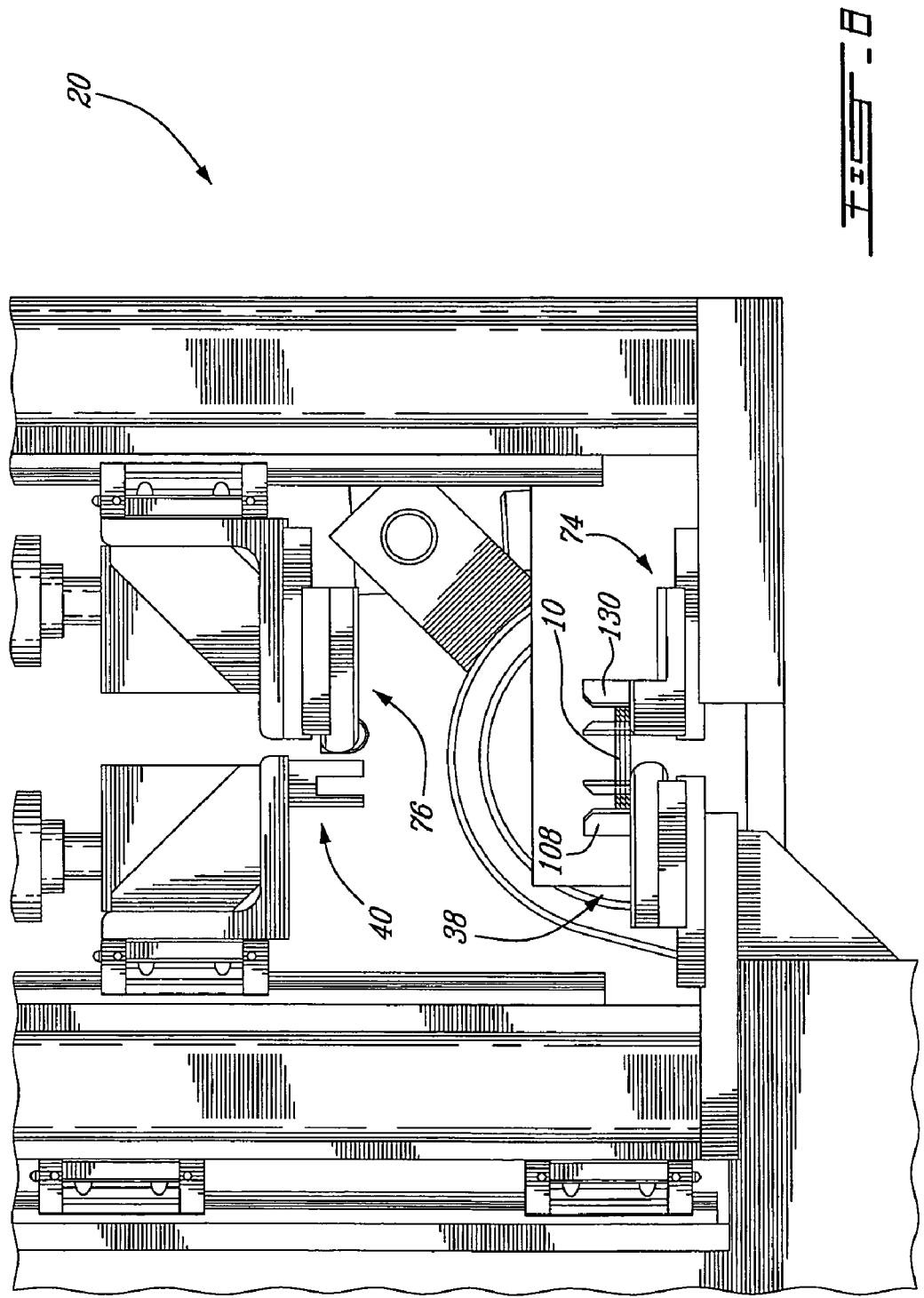
FIGS. 8 to 13 illustrate the head forming machine of FIG. 2 in operation.

FIG. 8 illustrates the machine 20 immediately after the unformed coil 10 has been inserted in the U-shaped brackets 108 and 130 of the first and second leg receiving mechanisms 38 and 74. It is to be noted that, at this stage, the first and second leg restraining mechanisms 40 and 76 are in their non-contacting position wherein the first and second legs 16 and 18 are unrestrained respectively in the first and second leg receiving mechanisms 38 and 74.

Figure 9:
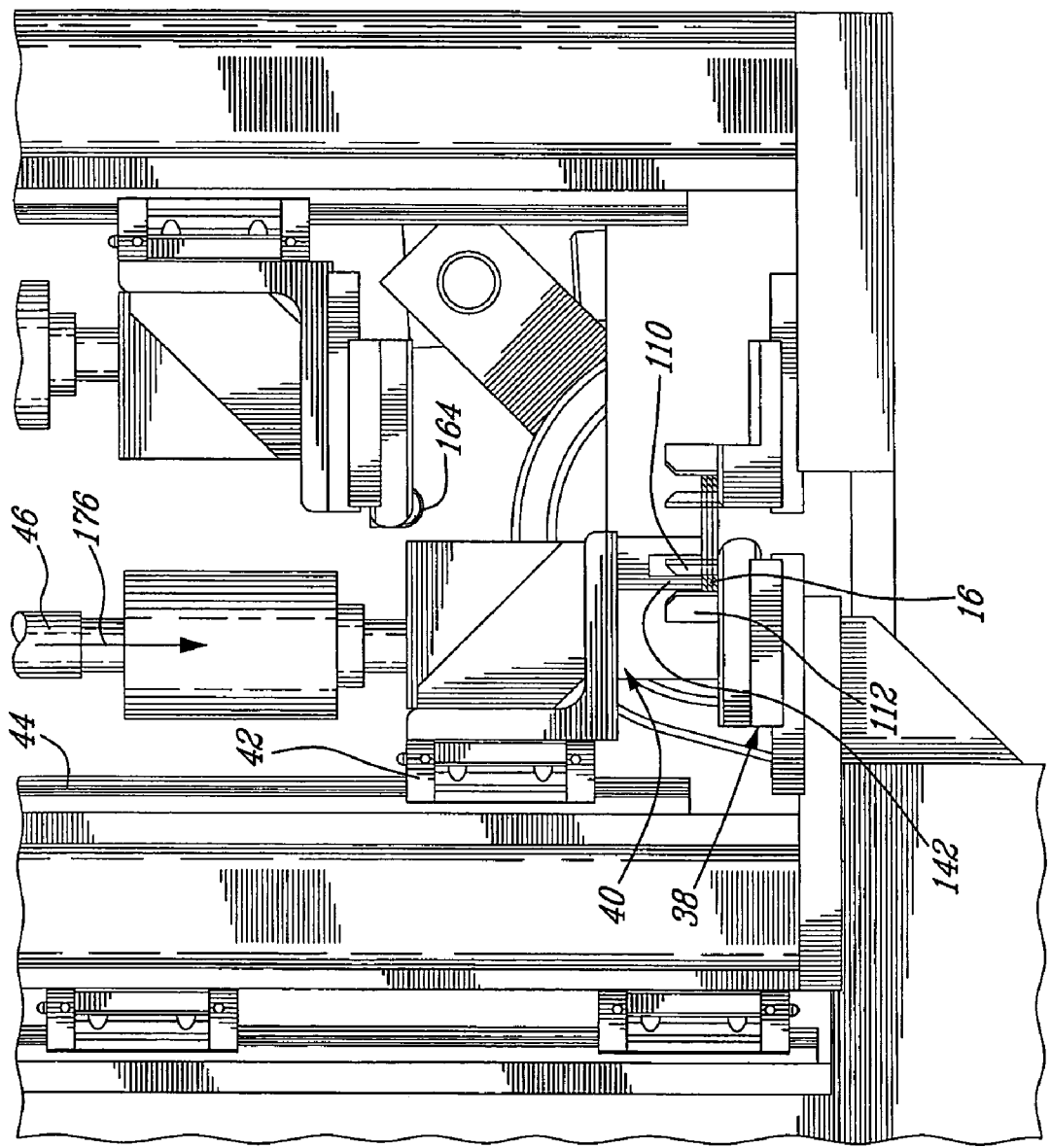

Next, as shown in FIG. 9, the first leg restraining mechanism 40 is lowered (see arrow 176) under the action of the piston 46. This movement is made possible via the corresponding sliding elements 42 and 44. As can be seen from this figure, the outer wall 142 goes between walls 110 and 112 of the first leg receiving mechanism 38, and abuts the first leg 16 to thereby maintain the first leg 16 in the first leg receiving mechanism 38.

Figure 10:
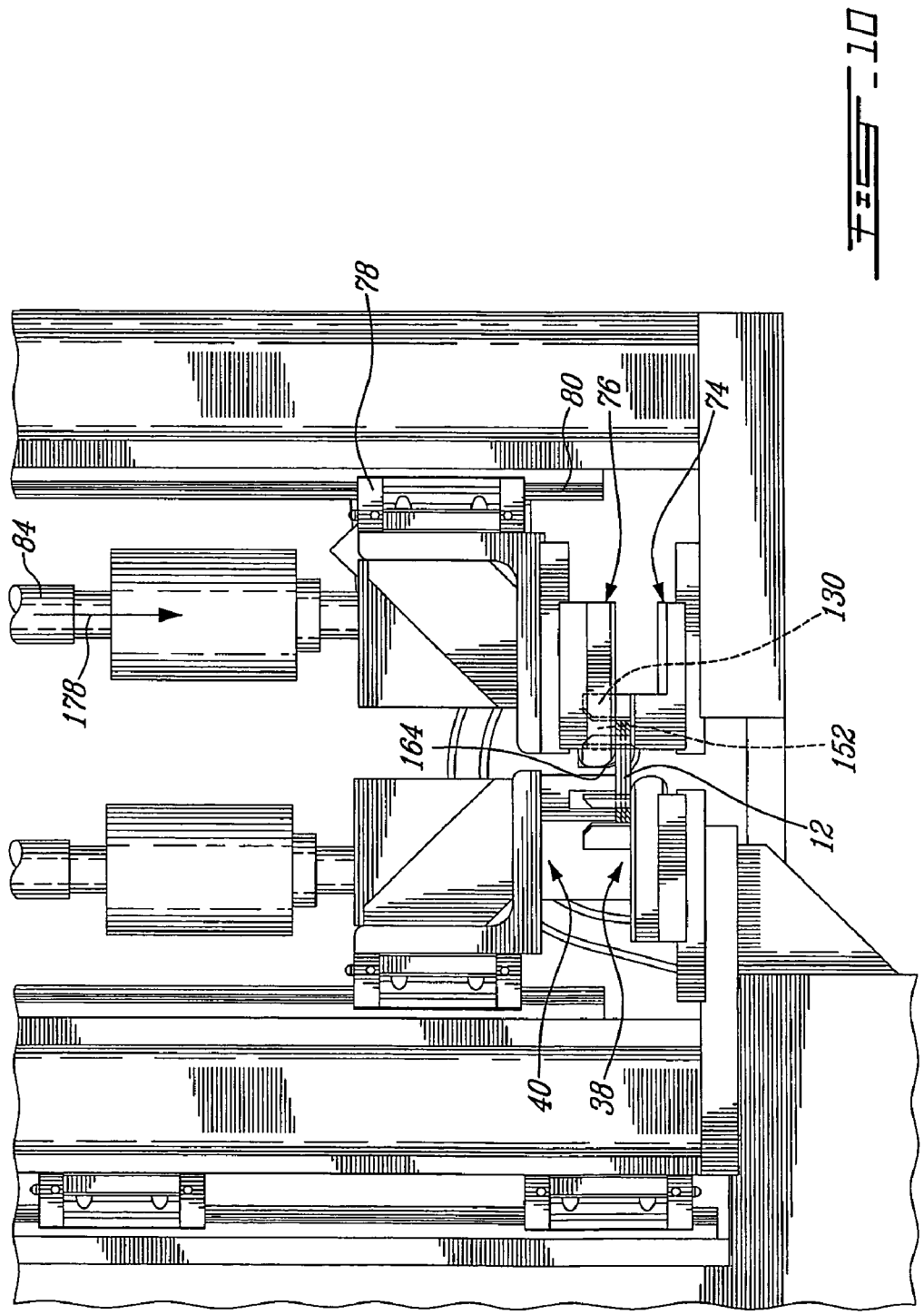

FIG. 10 illustrates the next step of the head forming. In this step, the second leg restraining mechanism 76 is lowered (see arrow 178) under the action of the piston 84. This movement is possible via the corresponding sliding elements 78 and 80. This action has two main consequences. First, the projections 150 and 152 (only projection 152 shown in dashed lines) enters between the inner and outer walls of the U-shaped brackets 128 and 130 (only bracket 130 shown in dashed lines) to thereby maintain the second leg 18 in the second leg receiving mechanism 74. Second, the rounded projection 164 of the first head shaping element 154, which projects lower than the projections 150 and 152 as can be better seen from FIG. 9, begin the controlled deformation of a first portion of the first head 12 of the coil 10 by forcing this first portion of the head 12 to conform to the shape of the rounded projection 164. This first controlled deformation is allowed by the relative movement of the rounded projection 164 and the first head portion via the second leg receiving mechanism 74.

Figure 11:
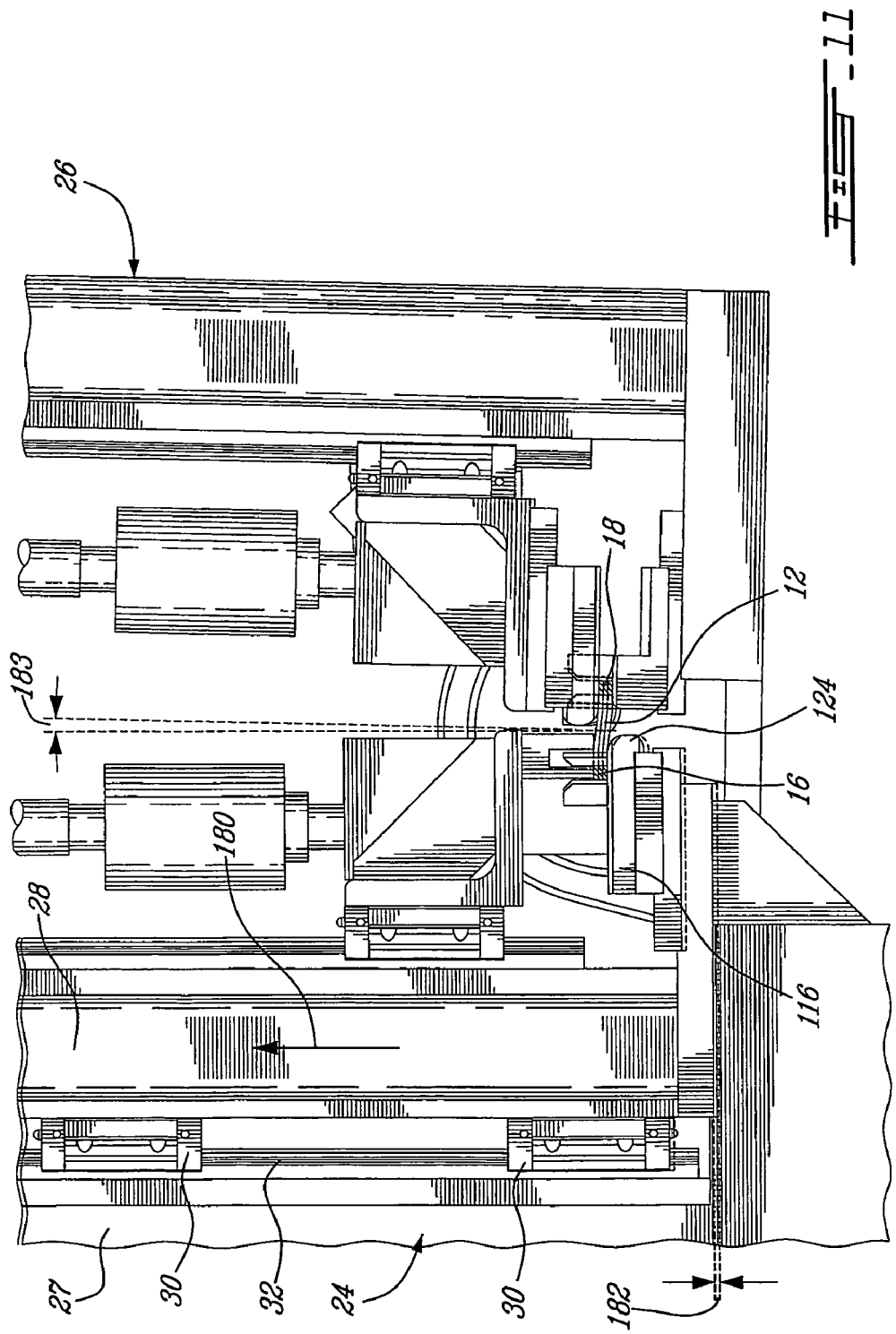

The next step, illustrated in FIG. 11, consists in an upward movement of the movable portion 28 with respect to the fixed portion 27 (see arrow 180) under the action of the piston 36 of the cylinder 34 (see FIG. 4). This movement is possible via the corresponding sliding elements 30 and 32. It is to be noted that the amplitude of the sliding movement of the movable portion 28 (see arrow 182) is limited by the adjustable stop 37 (see FIG. 4). This upward movement of the movable portion 28 causes further controlled deformation of the heads 12 and 14 of the coil 10. Indeed, since the legs 16 and 18 are firmly secured between the receiving and restraining assemblies 38, 40, 74 and 76, the movement of the first leg 16 in the direction of arrow 180 causes second and third portions of respectively the heads 12 and 14 to be deformed by their contact with the rounded noses 124 of the first and second head shaping elements 114 and 116 (only 116 shown in FIG. 11). These second and third controlled deformations of the heads 12-14 are allowed by the relative movement of the rounded noses 124 and the second and third head portions.

As can also be seen in FIG. 11, the second assembly 26 reacts to the upward movement of the movable portion 28. More specifically, the shaft 68 (see FIG. 3) is kept free to pivot (see arrow 183) to prepare for the next step and to prevent unwanted deformation.

Figure 12:
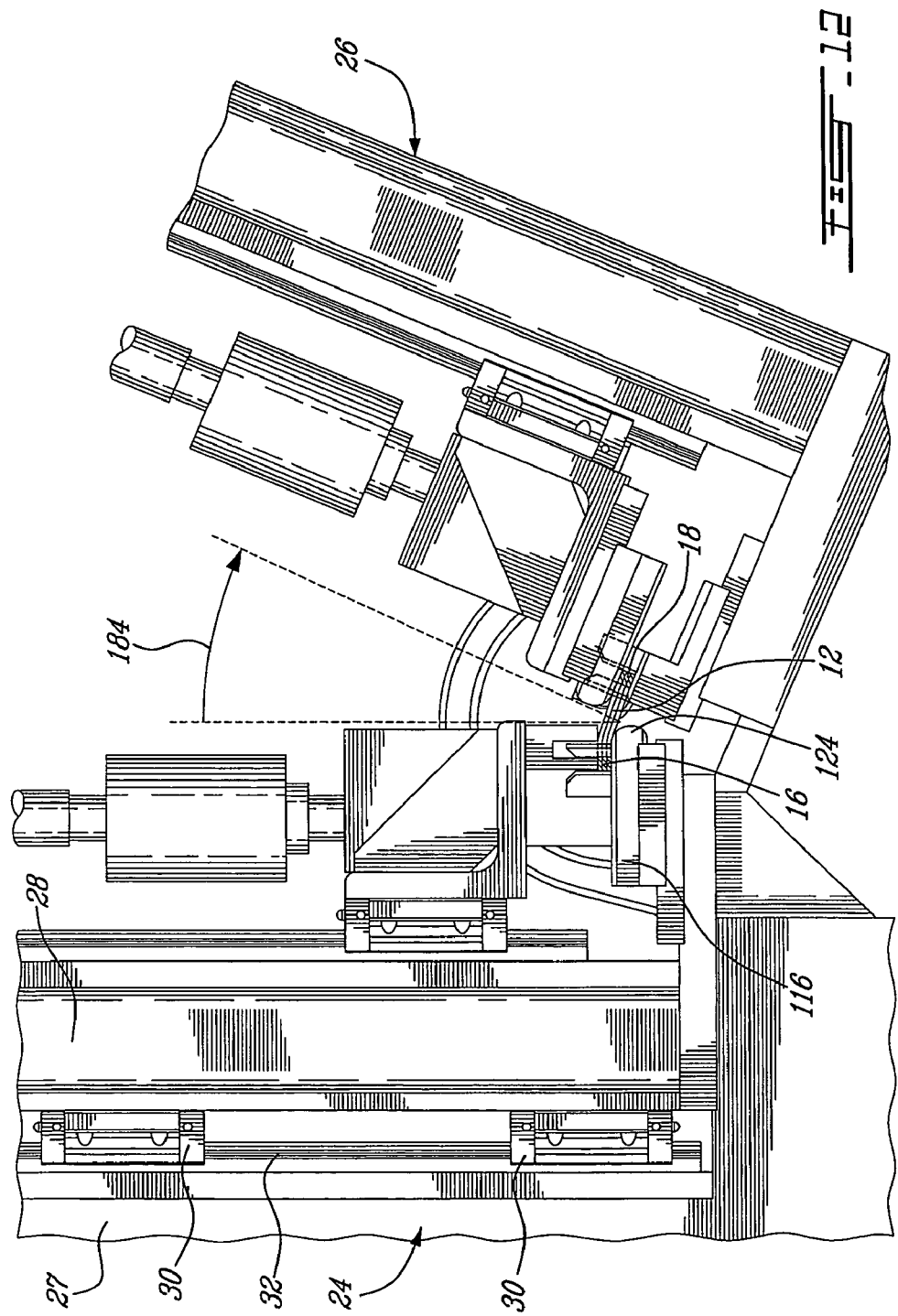

In FIG. 12, the second assembly 26 is pivoted with respect to the first assembly 24 (see arrow 184) under the action of the piston 88 of the cylinder 90 acting on the shaft 68 (see FIG. 3). This pivoting action of the second assembly 26 causes further controlled deformation of the heads 12 and 14 of the coil 10. Indeed, since the legs 16 and 18 are firmly secured between the receiving and restraining assemblies 38, 40, 74 and 76, the pivoting action causes the heads 12 and 14 to be deformed by their further contact with the rounded noses 124 of the first and second head shaping forms 114 and 116 (only 116 shown in FIG. 12).

Figure 13:
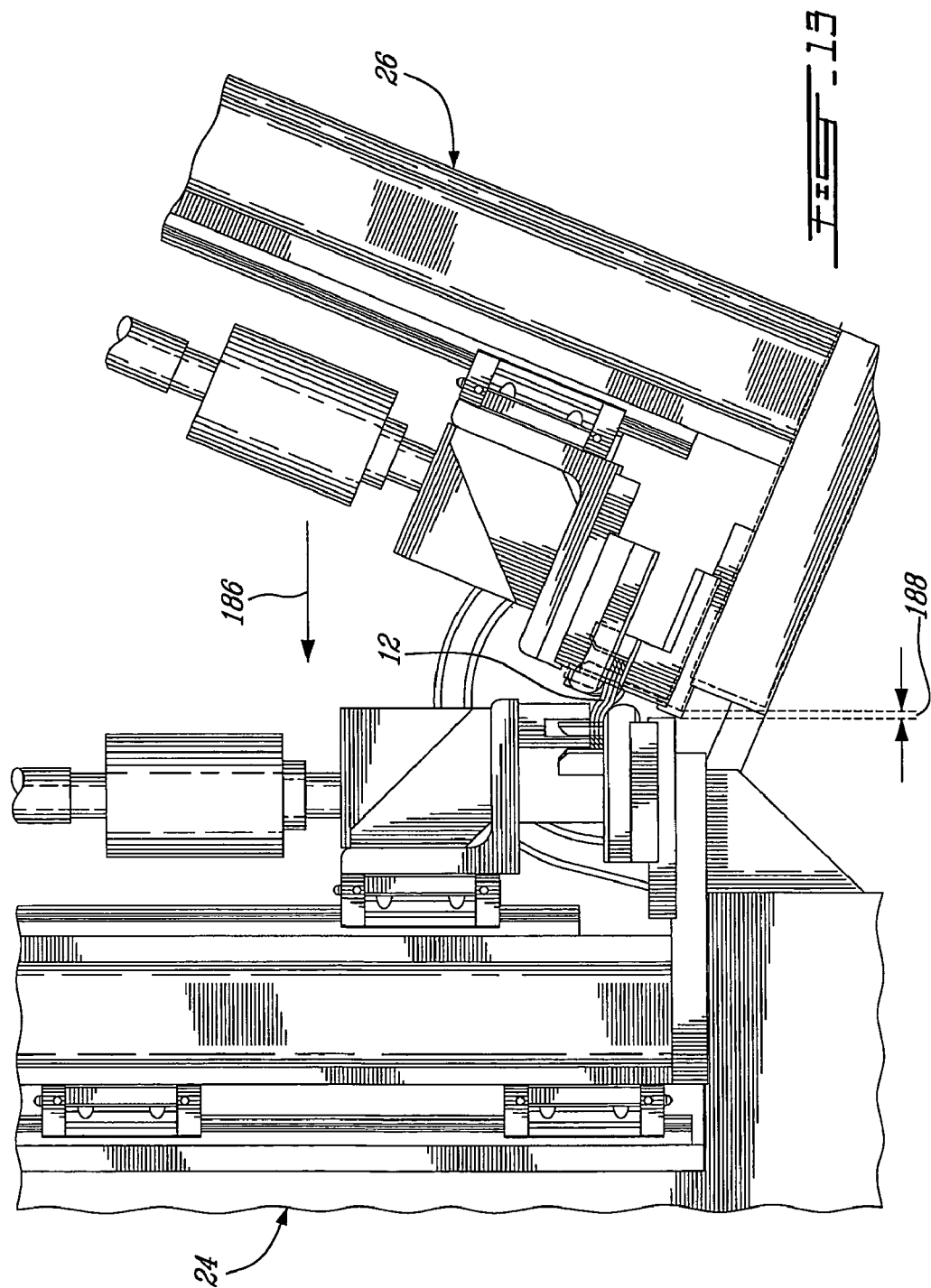
Figure 14:
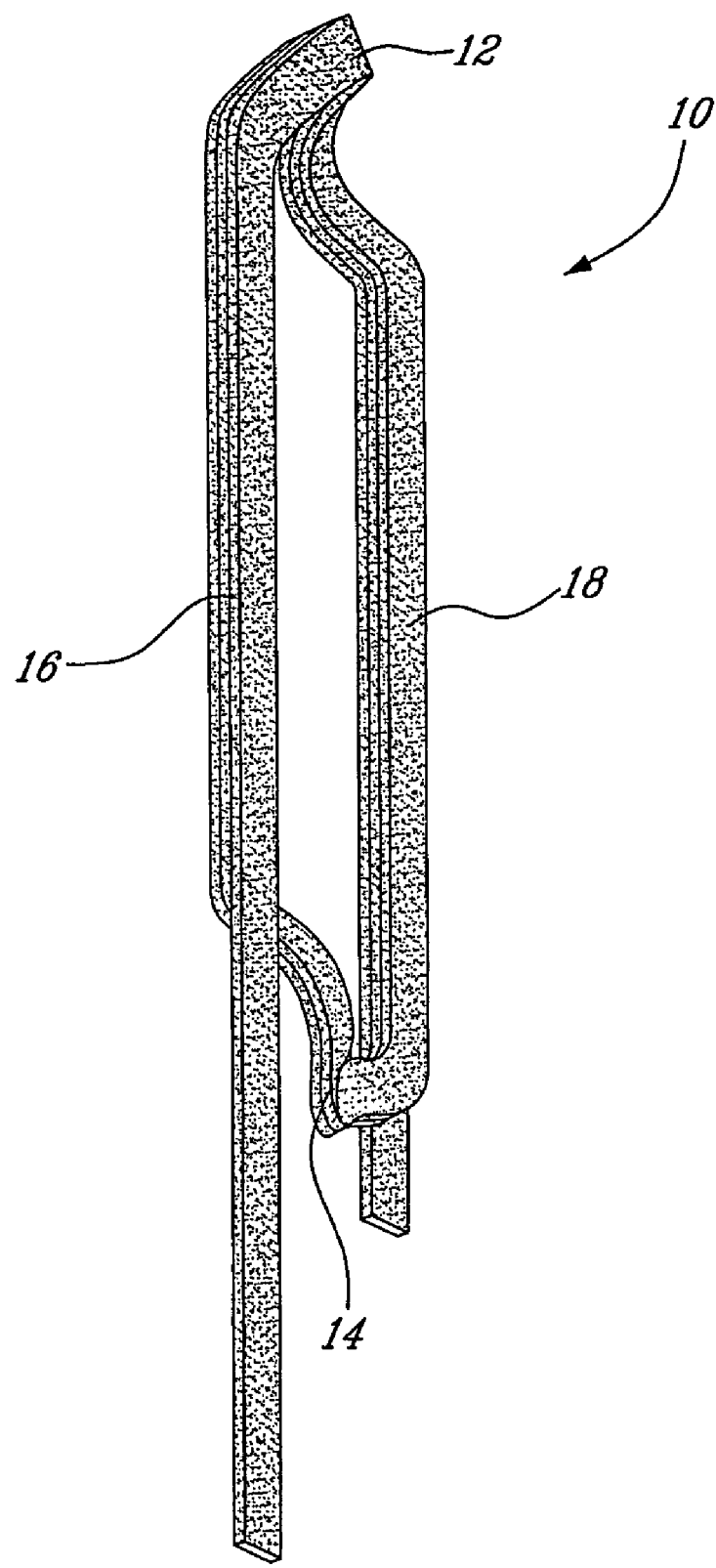
FIG. 14 is a perspective view of the coil of FIG. 1 having had its heads formed.

The last step in the deformation of the coil 10 is illustrated in FIG. 13. This last step consists in the movement of the second assembly 26 towards the first assembly 24 (see arrow 186). This movement is actuated by the piston 56 of the cylinder 58 (see FIG. 3). It is to be noted that the amplitude of the sliding movement of the second assembly 26 (see arrow 188) is limited by the adjustable stop 60 (see FIG. 4). As can be seen from FIG. 13, the movement along the direction of arrow 186 causes the heads 12 and 14 to deform according to a wave-shape, giving the heads 12 and 14 their final shape illustrated in FIG. 14.

To remove the coil 10 from the machine 20, the leg restraining mechanisms 40 and 76 are returned to their original position while the rest of the elements are maintained in their position illustrated in FIG. 13. The coil may then be removed from the leg receiving mechanisms 38 and 74.

It is to be noted that the distances and angles of movement of the various elements of the machine 20 have been illustrated herein as examples only and are adjustable by the controller 92 and the various adjustable stops. Furthermore, the elements of the machine could be resized as required by bigger or smaller coils.

The head forming elements can have other shapes and configurations than those illustrated so as to impart other forms to the heads 12 and 14. Moreover, different head forming elements can be used for different portions of the heads 12 and 14.

It is believed to be within the reach of a person skilled in the art to modify the machine 20 to allow for other or additional relative movements between head forming elements 114, 116, 154 and 156 and the heads 12 and 14 via the first and second leg support mechanisms 23 and 25.

The first and second leg supports 23 and 25 can take other form than those illustrated allowing receiving and restraining the legs 16 and 18.

Even though some elements of the machine 20 have been illustrated fastened using fasteners, other fastening means can be used including welding, clipping, etc.

A machine for forming the heads of a semi-rigid wire coil according to the present invention is not limited to rectangular wires and can be used to form heads of semi-rigid wire coil formed from any wire having a cross section characterized by having two parallel faces.

Although the present invention has been described hereinabove by way of illustrated embodiments thereof, it can be modified, without departing from the spirit and nature of the subject invention as defined in the appended claims.

What is claimed is:

1. A wire coil head forming machine for forming first and second heads of a semi-rigid wire coil separated by first and second legs, the machine comprising:
a frame;
first and second leg support mechanisms so configured as to respectively grip the first and second legs; said first leg support mechanism being so mounted to said frame as to be moveable along a first axis; said second leg support mechanism being so mounted to said frame as to independently a) be movable along a second axis, and b) be pivotable along a pivot axis; said first, second and pivot axes being generally orthogonal; and
at least one head forming element so configured as to contact at least a first portion of one of the first and second heads of the wire coil while said first and second legs are respectively gripped by said first and second leg support mechanisms;
wherein, the first and second heads of the semi-rigid wire coil are formed by a) the movement of the first leg support mechanism along the first axis, b) the pivoting movement of the second leg support mechanism about the pivot axis and c) the movement of the second leg support mechanism along the second axis, while the at least one head forming element contacts at least a first portion of one of the first and second heads,
wherein each of said first and second leg support mechanisms is mounted to the frame via respective first and second mounting assemblies, wherein said first mounting assembly includes a first movable portion movably mounting said first leg support mechanism to said frame for movements along said first axis, wherein said second mounting assembly includes a second movable portion that is slidably mounted to said frame so as to be movable along the second axis, and wherein said second movable portion includes a supporting table slidably mounted to said frame.

2. A machine as recited in claim 1, further comprising a first actuator and a controller coupled to said first actuator for controlling the operation thereof.

3. A machine as recited in claim 2, wherein said first actuator being coupled to said at least one head forming element, said first leg support mechanism and said second leg support mechanism.

4. A machine as recited in claim 3, wherein; said at least one head forming element being secured to one of said first movable portion and said second mounting assembly for first relative movement with at least one of said first and second leg support mechanisms; said first mounting assembly further including a second actuator mounted to both said first movable portion and said frame for selectively moving said first movable portion relatively to said frame.

5. A machine as recited in claim 4, wherein said first actuator and said second actuator are the same.

6. A machine as recited in claim 4, further comprising a controller coupled to both said first and second actuator for controlling the operation thereof.

7. A machine as recited in claim 4, wherein said first leg support mechanism includes a first leg receiving mechanism fixedly mounted to said first movable portion for receiving the first leg and a first leg restraining mechanism mounted to said first movable portion for reciprocating movement between a resting position and a restraining position wherein said first leg restraining mechanism restrains the first leg received in said first leg receiving mechanism.

8. A machine as recited in claim 7, wherein said first support mechanism further includes a first leg restraining actuator coupled to both said first leg restraining mechanism and said first movable portion for selectively moving said first leg restraining mechanism between said first resting position to said first restraining position.

9. A machine as recited in claim 7, wherein said first leg support mechanism further comprises a first support plate secured to said first movable portion; said first leg receiving mechanism being mounted to said first support plate.

10. A machine as recited in claim 9, wherein said first leg receiving mechanism includes at least one first U-shaped bracket mounted to said first support plate and configured for receiving said first leg therein.

11. A machine as recited in claim 10, wherein said first leg restraining mechanism includes at least one wall for insertion in said at least one first U-shaped bracket and for contacting said first leg.

12. A machine as recited in claim 11, wherein said first leg restraining mechanism includes a first wall for insertion in said at least one first U-shaped bracket and a second wall for contacting said first support plate.

13. A machine as recited in claim 12, wherein said at least one head forming element is secured to said first support plate for relative movement with said second leg support mechanism.

14. A machine as recited in claim 13, wherein said at least one head forming element includes a fixed portion secured to said support plate and an adjustable portion removably mounted to said fixed portion for contacting said at least a first portion of the first and second heads.

15. A machine as recited in claim 14, wherein one of said fixed and adjustable portions of said at least one head forming element includes elongated apertures for adjustably mounting said adjustable portion to said fixed portion via fasteners.

16. A machine as recited in claim 9, wherein said at least one head forming element includes first and second head forming elements secured to said first support plate for contacting first and second portions of at least one of the first and second heads; said two head forming elements being secured to said first support plate for relative movement with said second leg support mechanism.

17. A machine as recited in claim 9, wherein said second movable portion movably mounting said second leg support mechanism to said frame; said second mounting assembly further including a third actuator mounted to both said second movable portion and said frame for selectively moving said second movable portion relatively to said frame along said second axis.

18. A machine as recited in claim 17, further comprising a controller coupled to said first, second and third actuators for controlling the operation thereof.

19. A machine as recited in claim 17, wherein said second leg support mechanism includes a second leg receiving mechanism fixedly mounted to said second movable portion for receiving the second leg and a second leg restraining mechanism mounted to said second movable portion for reciprocating movement between a resting position and a restraining position wherein the second leg restraining mechanism restrains the second leg received in said second leg receiving mechanism.

20. A machine as recited in claim 19, wherein said second support mechanism further includes a second leg restraining actuator coupled to both said second leg restraining mechanism and said second movable portion for selectively moving said second leg restraining mechanism between said second resting position to said second restraining position.

21. A machine as recited in claim 19, wherein said second leg support mechanism further includes a second support plate secured to said second movable portion; said second leg receiving mechanism being mounted to said second support plate.

22. A machine as recited in claim 21, wherein said second leg receiving mechanism includes at least one second U-shaped bracket mounted to said second support plate and configured for receiving said second leg therein.

23. A machine as recited in claim 22, wherein said second leg restraining mechanism includes at least one wall for insertion in said at least one second U-shaped bracket and for contacting said second leg.

24. A machine as recited in claim 23, wherein said second leg restraining mechanism includes a third wall for insertion in said at least one second U-shaped bracket and a fourth wall for contacting said second support plate.

25. A machine as recited in claim 21, wherein said at least one head forming element includes a second head forming elements secured to said second support plate for second relative movement with said first leg support mechanism for contacting at least a second first portion of the first and second heads.

26. A machine as recited in claim 25, wherein said second head forming element includes a second fixed portion secured to said second support plate and a second adjustable portion removably mounted to said second fixed portion for contacting said at least a second first portion of the first and second heads.

27. A machine as recited in claim 26, wherein one of said second fixed and adjustable portions of said second head forming element includes elongated apertures for adjustably mounting said second adjustable portion to said second fixed portion via fasteners.

28. A machine as recited in claim 26, wherein said second head forming element includes two second head forming elements secured to said second support plate for contacting second and third portions of at least one of the first and second heads.

29. A machine as recited in claim 17, wherein said second mounting assembly further includes at least one stop for limiting a range of motion of said second movable portion relatively to said frame.

30. A machine as recited in claim 17, wherein said second mounting assembly further includes a pivoting sub-assembly pivotably mounted to said supporting table; said second movable portion being slidably mounted to said pivoting sub-assembly; said pivoting sub-assembly further including a pivoting actuator mounted to said frame for pivoting said second leg support mechanism relatively to said first support mechanism.

31. A machine as recited in claim 30, further comprising a controller coupled to said first, second, third and pivoting actuators for controlling the operation thereof.

32. A machine as recited in claim 30, wherein said pivoting sub-assembly is pivotably mounted to said table via a shaft secured to said table via two pillow blocks; said shaft defining the pivot axis.

33. A machine as recited in claim 32, wherein said pivoting actuator is coupled to both said shaft and said frame for pivoting said second leg support mechanism relatively to said first support mechanism.

34. A machine as recited in claim 4, wherein said first mounting assembly further includes a stop for limiting a range of motion of said first movable portion relative to said frame.

35. A machine as recited in claim 4, wherein said first movable portion is slidably mounted to said frame so as to be movable along the first axis.

36. A machine as recited in claim 3, wherein each said first and second leg support mechanisms includes respective first and second leg receiving mechanisms for respectively receiving said first and second legs and respective first and second leg restraining mechanisms for respectively restraining said first and second legs while said first and second legs are received in respectively said first and second leg receiving mechanisms.

37. A machine as recited in claim 1, wherein said at least one head forming element includes a rounded nose for imparting a shape to said at least a first portion of one of the first and second heads.

38. A machine as recited in claim 1, wherein said wire coil is made of a rectangular wire.

39. The machine as recited in claim 1, wherein said second mounting assembly further includes a pivoting sub-assembly pivotably mounted to said supporting table, said second movable portion being slidably mounted to said pivoting sub-assembly, wherein said pivoting sub-assembly further includes a pivoting actuator mounted to said frame for pivoting said second leg support mechanism relative to said first support mechanism.

40. The machine as recited in claim 39, wherein said pivoting sub-assembly is pivotably mounted to said table via a shaft secured to said table via two pillow blocks, said shaft defining the pivot axis.

41. The machine as recited in claim 40, wherein said pivoting actuator is coupled to both said shaft and said frame for pivoting said second leg support mechanism relative to said first support mechanism.

* * * * *